J. A. McALLISTER.
WAGON FOOT REST.
APPLICATION FILED SEPT. 29, 1914.
1,143,770.  
Patented June 22, 1915.
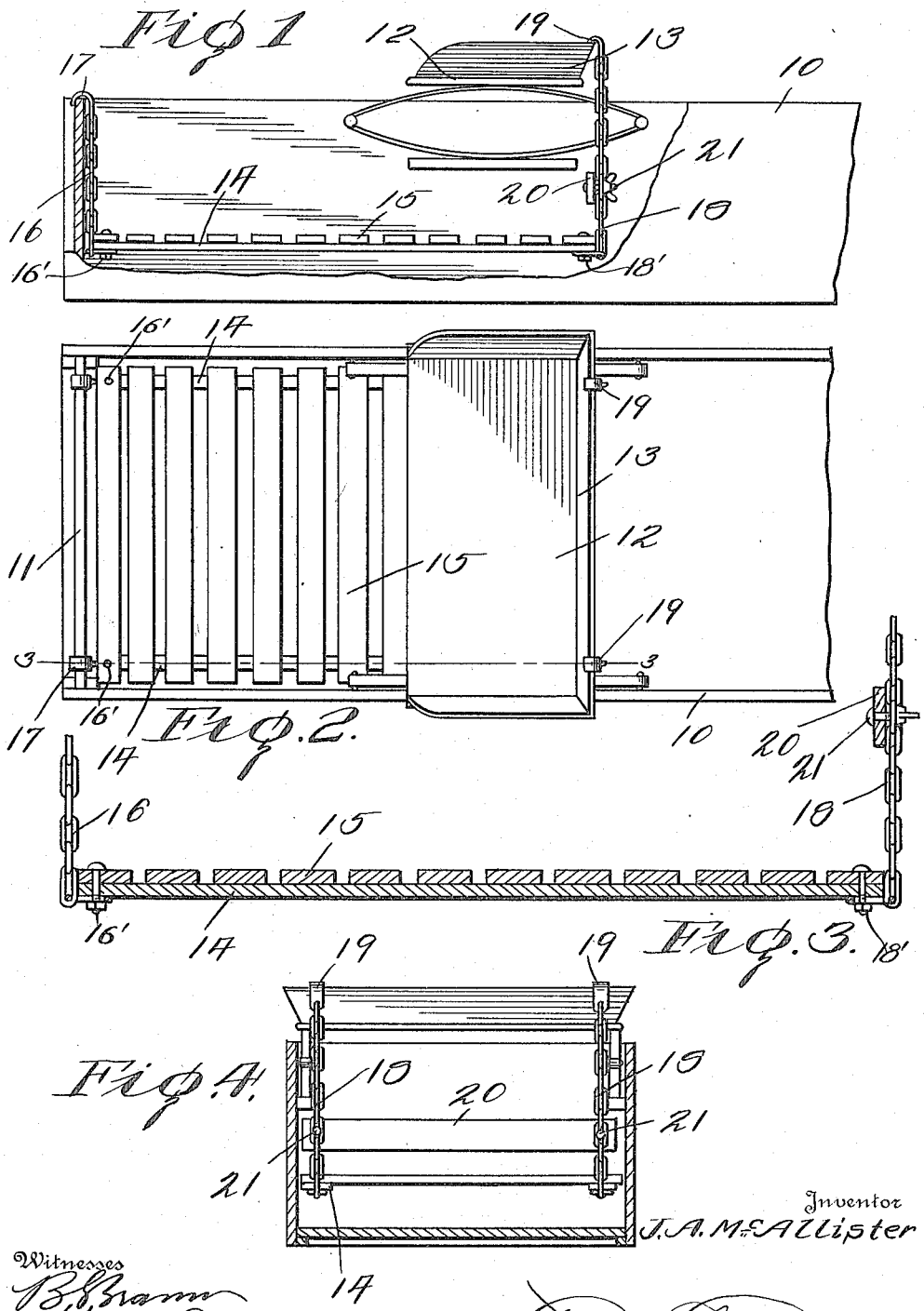

UNITED STATES PATENT OFFICE.

JOHN A. McALLISTER, OF MADISON, SOUTH DAKOTA.

WAGON FOOT-REST.

1,143,770. Specification of Letters Patent. Patented June 22, 1915.

Application filed September 29, 1914. Serial No. 864,177.

*To all whom it may concern:*

Be it known that I, JOHN A. MCALLISTER, a citizen of the United States, residing at Madison, in the county of Lake, State of South Dakota, have invented certain new and useful Improvements in Wagon Foot-Rests; and I do hereby declare the following to be a full, clear, and exact description of the invention, such as will enable others skilled in the art to which it appertains to make and use the same.

This invention relates to improvements in wagon attachments, and particularly to foot rests.

One object of the invention is to provide a simple and novel foot rest which can be quickly and easily applied to or removed from the wagon.

Another object is to provide a device of this character which is particularly adapted for use with a spring seat, the device being connected therewith so that the foot rest will move with the seat, thus making it more comfortable than were the foot rest rigid.

A further object is to provide an auxiliary platform for a wagon on which articles can be carried without danger of injury thereto or breakage thereof.

Other objects and advantages will be apparent from the following description when taken in connection with the accompanying drawings.

In the drawings, Figure 1 is a side elevation of a wagon partly broken away showing my invention in applied position: Fig. 2 is a top plan view of the same: Fig. 3 is a longitudinal sectional view on the line 3—3 of Fig. 2: and Fig. 4 is an elevation looking from the rear of the wagon seat.

Referring particularly to the accompanying drawings, 10 represents the body of the wagon which includes the dashboard 11 or front end gate, 12 representing the spring seat. This seat has the ordinary back 13.

My foot rest attachment includes a pair of parallel strips 14 spaced a proper distance apart and having secured thereto the ends of a number of parallel slats or foot boards 15. Secured to the forward ends of the strips 14 by means of the bolts 16′ are the shorter chains 16 which carry on their outer ends the hooks 17, said hooks being engaged over the upper edge of the dashboard, as shown. Secured to the rear ends of the strips by means of the bolts 18′ are longer chains 18 which carry on their outer ends the hooks 19, these hooks being engaged over the upper edge of the back of the seat from the rear thereof. In this position a portion of the foot rest will be disposed beneath the seat, and on this foot rest it is possible to carry small articles or packages. To prevent the articles or packages from falling through the rear of the foot rest into the wagon box, I provide a rail 20 which I adjustably secure to the chains 18 by means of the bolts 21. This forms a barrier at the rear end of the foot rest so that articles cannot fall therethrough, the ends of the foot rest being arranged in close proximity to the sides of the wagon box so that there will be no danger of articles falling from the ends.

It will thus be seen that by reason of the attachment of the chains 18 to the rear of the seat, the platform will move up and down with the seat, thus making it more comfortable for the rider, while at the same time preventing jarring and breaking of articles carried thereon. It will also be seen that the different links of the chains 16 and 18 may be engaged with the bolts 16′ and 18′ to adjust the platform to different heights.

What is claimed is:

A foot rest attachment for a wagon comprising a slatted platform, shorter flexible elements carried by the forward portion of the platform, hooks carried by the flexible elements for attachable engagement with the dashboard of the wagon, longer flexible elements carried by the opposite side of each platform, hooks carried by the flexible elements for engagement with the upper edge of the back of the seat of the wagon, and an adjustable guard rail carried by the said longer flexible element.

In testimony whereof, I affix my signature, in the presence of two witnesses.

JOHN A. McALLISTER.

Witnesses:
C. H. OWENS,
SADIE E. ADAMS.

Copies of this patent may be obtained for five cents each, by addressing the "Commissioner of Patents, Washington, D. C."